US011268546B2

(12) United States Patent

Van Wijk et al.

(10) Patent No.: US 11,268,546 B2

(45) Date of Patent: Mar. 8, 2022

(54) FLUSH PUMP AND HYDRAULIC SYSTEM

(71) Applicant: Carrier Corporation, Palm Beach Gardens, FL (US)

(72) Inventors: Rudolf Johannes Van Wijk, Waddinxveen (NL); Eeuwe Durk Kooi, Noordwijk (NL)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/045,052

(22) PCT Filed: Apr. 2, 2019

(86) PCT No.: PCT/US2019/025279

§ 371 (c)(1),
(2) Date: Oct. 2, 2020

(87) PCT Pub. No.: WO2019/195209

PCT Pub. Date: Oct. 10, 2019

(65) Prior Publication Data

US 2021/0156404 A1 May 27, 2021

Related U.S. Application Data

(60) Provisional application No. 62/651,393, filed on Apr. 2, 2018.

(51) Int. Cl.
*F15B 13/042* (2006.01)
*F04B 17/00* (2006.01)
(Continued)

(52) U.S. Cl.
CPC ............ *F15B 13/042* (2013.01); *F04B 17/00* (2013.01); *F04B 49/24* (2013.01); *F15B 11/08* (2013.01)

(58) Field of Classification Search
CPC .......................... B61D 43/00; F15B 2211/613
See application file for complete search history.

(56) References Cited

U.S. PATENT DOCUMENTS 2,101,495 A 12/1937 Ferris et al.
2,477,974 A 8/1949 Ferris
(Continued)

FOREIGN PATENT DOCUMENTS

CN 101088821 A 12/2007
DE 202004013186 U1 1/2005
(Continued)

OTHER PUBLICATIONS

International Search Report for International Application No. PCT/US2019/025279, International Filing Date: Apr. 2, 2019, dated Jun. 27, 2019; 6 pages.
(Continued)

*Primary Examiner* — Thomas E Lazo
(74) *Attorney, Agent, or Firm* — Cantor Colburn LLP

(57) ABSTRACT

An electrical power generation system includes a hydraulic pump configured to be switchable between operating in a first pump direction and in a second pump direction opposite the first pump direction and a hydraulic motor operably connected to the hydraulic pump to convert hydraulic flow into electrical power. The hydraulic motor has a motor inlet passage and a motor outlet passage. A hydraulic block is located in flow communication with the hydraulic pump and with the hydraulic motor. The hydraulic block is configured such that hydraulic fluid flow exiting the hydraulic block toward the hydraulic motor is directed through the motor inlet passage, regardless of whether the hydraulic pump is operating in the first pump or the second pump direction.

15 Claims, 4 Drawing Sheets

(51) Int. Cl.

| | |
|---|---|
| ***F04B 49/24*** | (2006.01) |
| ***F15B 11/08*** | (2006.01) |

(56) References Cited

U.S. PATENT DOCUMENTS

| | | | | |
|---|---|---|---|---|
| 2,910,013 | A * | 10/1959 | Murphy | B61D 43/00 105/96.1 |
| 4,437,015 | A | 3/1984 | Rosenblum | |
| 4,964,345 | A * | 10/1990 | Porel | B61D 43/00 105/96.1 |
| 5,123,245 | A | 6/1992 | Vilenius et al. | |
| 6,263,670 | B1 | 7/2001 | Gluck et al. | |
| 6,430,923 | B1 | 8/2002 | Meier | |
| 7,201,106 | B2 | 4/2007 | Whiston et al. | |
| 8,371,233 | B2 | 2/2013 | Kumar et al. | |
| 8,408,144 | B2 | 4/2013 | Read | |
| 8,468,952 | B2 | 6/2013 | Worden et al. | |
| 8,723,344 | B1 * | 5/2014 | Dierickx | H02K 7/1846 290/1 R |
| 8,776,928 | B2 * | 7/2014 | Stover, Jr. | B60H 1/3222 180/165 |
| 8,899,158 | B2 * | 12/2014 | Foege | B61C 17/02 105/35 |
| 2007/0284165 | A1 * | 12/2007 | Patterson | B60L 7/10 180/165 |
| 2008/0000381 | A1 | 1/2008 | Bartley et al. | |
| 2010/0154449 | A1 | 6/2010 | Stover, Jr. et al. | |
| 2016/0152138 | A1 | 6/2016 | McCann | |
| 2017/0129338 | A1 | 5/2017 | Cryer et al. | |
| 2017/0292539 | A1 | 10/2017 | Bauer et al. | |

FOREIGN PATENT DOCUMENTS

| | | | |
|---|---|---|---|
| DE | 102007005797 | A1 | 8/2008 |
| EP | 2105368 | B1 | 8/2011 |
| EP | 2740645 | B1 | 5/2016 |
| JP | 2003049809 | A | 2/2003 |
| RU | 062074 | U1 | 3/2007 |
| RU | 0102343 | U1 | 2/2011 |
| WO | 2010074938 | A1 | 7/2010 |

OTHER PUBLICATIONS

Written Opinion for International Application No. PCT/US2019/025279; International filing date: Apr. 2, 2019; dated Jun. 27, 2019; 6 pages.

* cited by examiner

FLUSH PUMP AND HYDRAULIC SYSTEM

CROSS REFERENCE TO RELATED APPLICATIONS

This application is a National Stage application of PCT/US2019/025279, filed Apr. 2, 2019, which claims the benefit of U.S. Provisional Application No. 62/651,393, filed Apr. 2, 2018, the disclosures of which are incorporated herein by reference in their entirety.

BACKGROUND

Exemplary embodiments pertain to the art of transportation refrigeration systems, and more particularly to hydraulic systems utilized in electrical power generation for transportation refrigeration systems.

Transportation refrigeration systems, such as those utilized with trucks, are refrigeration units typically driven by a diesel-powered engine, separate from the vehicle drive engine. In other transportation refrigeration systems, the refrigeration unit is powered by a hydraulic pump, which is connected to the truck's power take-off motor coupled to the vehicle drive engine. The hydraulic system drives a generator that delivers electrical power to the refrigeration unit, without any requirement for the refrigeration unit to use its own diesel engine. Integrated in the hydraulic system is a control unit that ensures the generator consistently runs the same number of revolutions. This maintains constant power, even when the vehicle is idling in heavy traffic—eliminating any need for the driver to rev the truck's engine to provide sufficient cooling; power.

It has been proposed to use such a system in a railway application, with the hydraulic pump driven by rotation of wheels of a railway car. One major difference between such a railway application and a truck application is that in the truck application, the rotation of the hydraulic pump is always in the same direction, due to the singular direction of rotation of the vehicle drive engine. In railway application, on the other hand, the hydraulic pump will run in two directions, depending on the direction of rotation of the railway wheels at the railway car.

BRIEF DESCRIPTION

In one embodiment, an electrical power generation system includes a hydraulic pump configured to be switchable between operating in a first pump direction and in a second pump direction opposite the first pump direction and a hydraulic motor operably connected to the hydraulic pump to convert hydraulic flow into electrical power. The hydraulic motor has a motor inlet passage and a motor outlet passage. A hydraulic block is located in flow communication with the hydraulic pump and with the hydraulic motor. The hydraulic block is configured such that hydraulic fluid flow exiting the hydraulic block toward the hydraulic motor is directed through the motor inlet passage, regardless of whether the hydraulic pump is operating in the first pump or the second pump direction.

Additionally or alternatively, in this or other embodiments the hydraulic block including a plurality of check valves interconnected with a plurality of hydraulic passages to direct hydraulic fluid flow through the hydraulic block.

Additionally or alternatively, in this or other embodiments the hydraulic block includes a pressure regulator.

Additionally or alternatively, in this or other embodiments a priming pump is operably connected to and driven by the hydraulic motor.

Additionally or alternatively, in this or other embodiments the priming pump is in fluid communication with a hydraulic fluid reservoir to maintain a selected hydraulic fluid pressure in the electrical power generation system.

Additionally or alternatively, in this or other embodiments the priming pump is driven in only one direction by the hydraulic motor.

Additionally or alternatively, in this or other embodiments the hydraulic motor is operably connected to one or more batteries to charge the one or more batteries.

In another embodiment, a transportation refrigeration system includes a cargo container, a refrigeration unit operably connected to the cargo container to condition an interior of the cargo container, and an electrical power generation system operably connected to the refrigeration unit to provide electrical power to the refrigeration unit. The electrical power generation system includes a hydraulic pump configured to be switchable between operating in a first pump direction and in a second pump direction opposite the first pump direction, a hydraulic motor operably connected to the hydraulic pump to convert hydraulic flow into electrical power, the hydraulic motor having a motor inlet passage and a motor outlet passage, and a hydraulic block located in flow communication with the hydraulic pump and with the hydraulic motor. The hydraulic block is configured such that hydraulic fluid flow exiting the hydraulic block toward the hydraulic motor is directed through the motor inlet passage, regardless of whether the hydraulic pump is operating in the first pump or the second pump direction.

Additionally or alternatively, in this or other embodiments the hydraulic block including a plurality of check valves interconnected with a plurality of hydraulic passages to direct hydraulic fluid flow through the hydraulic block.

Additionally or alternatively, in this or other embodiments the hydraulic block includes a pressure regulator.

Additionally or alternatively, in this or other embodiments a priming pump is operably connected to and driven by the hydraulic motor.

Additionally or alternatively, in this or other embodiments the priming pump is in fluid communication with a hydraulic fluid reservoir to maintain a selected hydraulic fluid pressure in the electrical power generation system.

Additionally or alternatively, in this or other embodiments the priming pump is driven in only one direction by the hydraulic motor.

Additionally or alternatively, in this or other embodiments the hydraulic motor is operably connected to one or more batteries to charge the one or more batteries.

Additionally or alternatively, in this or other embodiments the one or more batteries are operably connected to the refrigeration unit to provide electrical power to the refrigeration unit.

Additionally or alternatively, in this or other embodiments the hydraulic pump is driven by a rotation of a vehicle wheel.

Additionally or alternatively, in this or other embodiments the vehicle wheel is a railway car wheel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
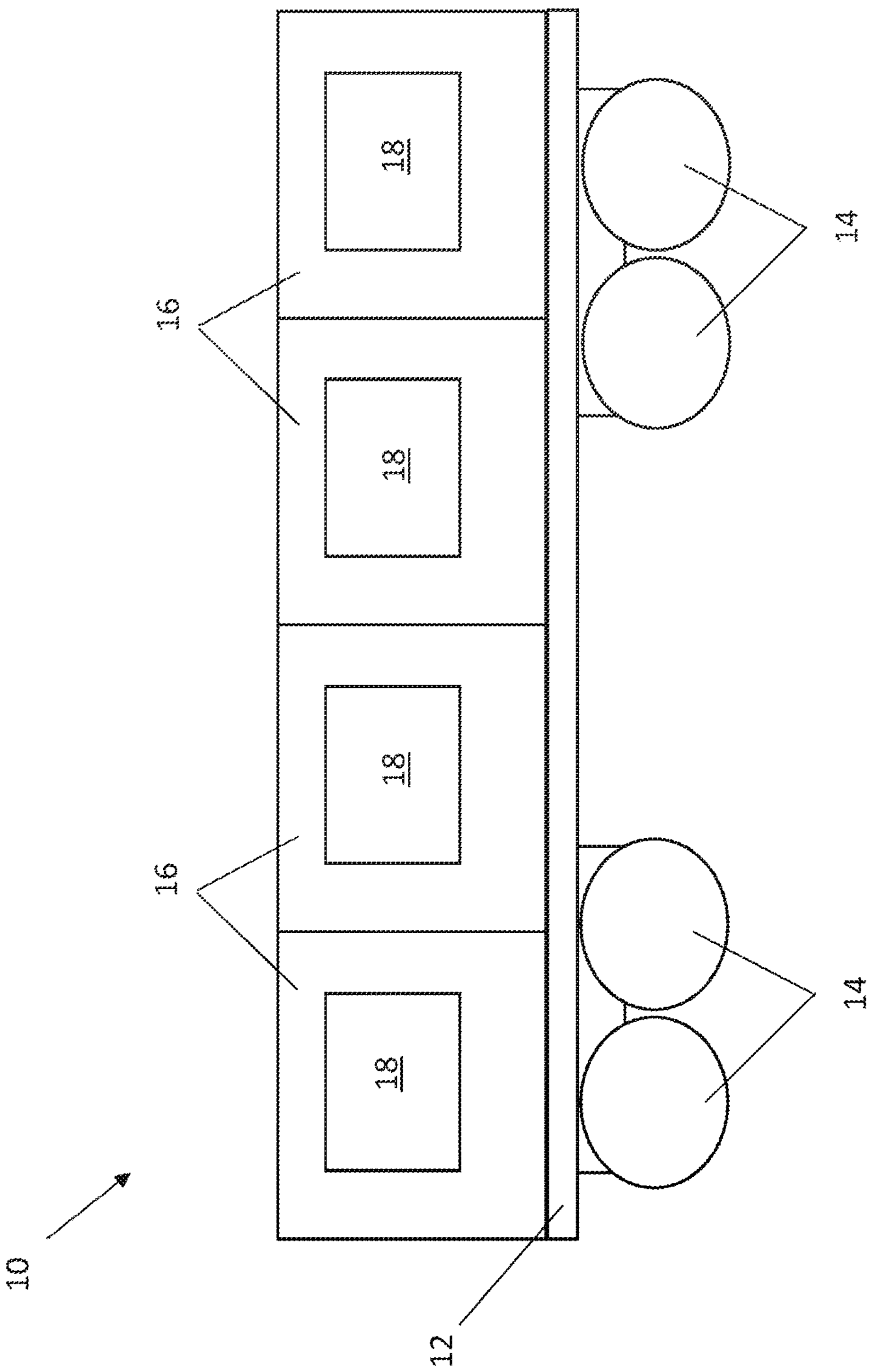
FIG. 1 is a schematic illustration of an embodiment of a railway car including one or more refrigerated cargo containers.

Referring to FIG. 1, illustrated is an embodiment of a railway car 10. The railway car 10 includes a car body 12, which is movable along a rail (not shown) via a plurality of wheels 14 rotatably connected to the car body 12 and interactive with the rail. One or more refrigerated cargo containers 16 are located at the car body 12 to be carried by the railway car 10. The refrigerated cargo container 16 includes a refrigeration unit 18 configured to maintain a cargo in the interior of the refrigerated cargo container 16 at a selected temperature. The refrigeration unit 18 is driven by electrical power. While four refrigerated cargo containers 16, each having a refrigeration unit 18, are shown in FIG. 1, it is to be appreciated that other quantities of refrigerated cargo containers 16, such as 1, 2, 3, 5 or more refrigerated cargo containers 16 may be located at the railway car 10.

Figure 2:
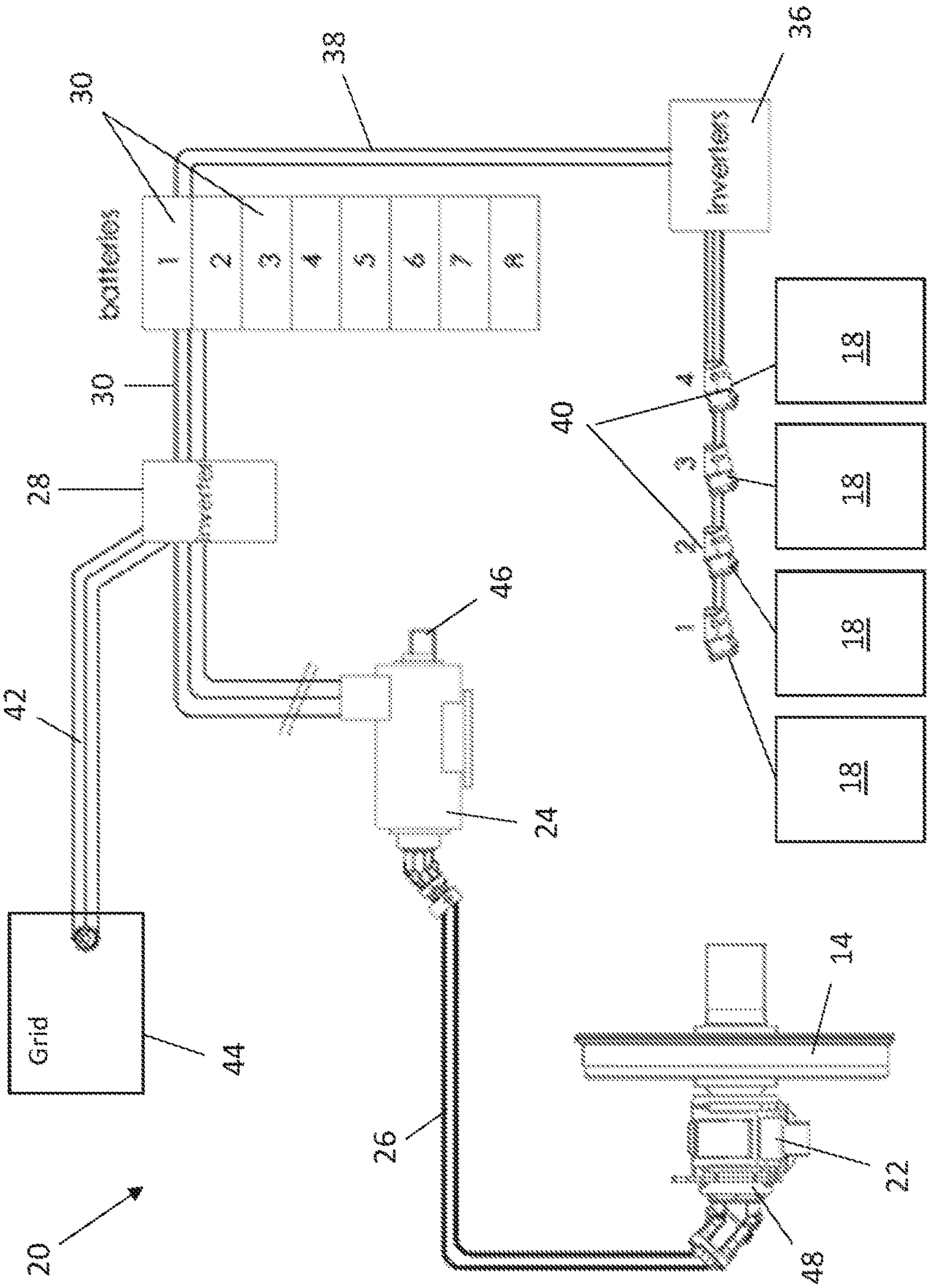
FIG. 2 is a schematic illustration of an electrical power generation system for the one or more refrigerated cargo containers.

Referring now to FIG. 2, a schematic illustration of an electrical power generation system 20 is illustrated. The electrical power generation system 20 is mounted on the railway car 10 to generate and provide electrical power to the refrigeration unit 18. The electrical power generation system 20 includes a hydraulic pump 22 configured to drive a flow of hydraulic fluid through the electrical power generation system 20. The hydraulic pump 22 is mounted to a wheel 14 of the railway car 10 such that rotation of the wheel 14 as the railway car 10 travels along the rail drives operation of the hydraulic pump 22. A hydraulic motor 24 including a generator is operably connected to the hydraulic pump 22 via hydraulic piping 26 with the flow of hydraulic fluid urging rotation of a rotor of the hydraulic motor 24 relative to a stator to generate electrical power at the hydraulic motor 24. The hydraulic motor 24 is connected to an inverter 28 via the generator and to one or more batteries 30 via a battery input line 32 such that the electrical power generated at the hydraulic motor 24 is utilized to charge the batteries 30. A battery output line 34 directs electrical power from the batteries 30 through one or more output inverters 36 via a battery output line 38 and to one or more plugs 40. The one or more plugs 40, or other connectors, are connectible to the refrigeration units 18 of the refrigerated cargo containers 16 to power operation of the refrigeration units 18. In some embodiments, the electrical power generation system 20 includes an electrical grid line 42 to optionally connect the electrical power generation system 20 to an electrical grid, schematically shown at 44, to charge the batteries 30.

The electrical power generation system 20 utilizes a priming pump 46 to maintain a hydraulic fluid pressure in the hydraulic components of the electrical power generation system 20, for example in the range of 10 bar or higher. The priming pump 46 is operably connected to the hydraulic motor 24 and driven by rotation of the rotor of the hydraulic motor 24 to maintain the selected hydraulic fluid pressure.

In an application such as described above, the hydraulic pump 22 is a two-way pump, so that the hydraulic pump 22 pumps hydraulic fluid through the electrical power generation system 20 regardless of the direction of rotation of the wheel 14 to which the hydraulic pump 22 is connected. Such operation will, in turn, drive rotation of the hydraulic motor 24 in one of two directions, depending on the direction of rotation of the wheel 14. Such two-directional rotation, however, will cause operational problems for the priming pump 46, such as cavitation.

To prevent such operational problems at the priming pump 46, the electrical power generation system 20 includes a hydraulic block 48 located along a hydraulic fluid pathway between the hydraulic pump 22 and the hydraulic motor 24. While in the embodiment of FIG. 2, the hydraulic block 48 located at the hydraulic pump 22, it is to be appreciated that in other embodiments the hydraulic block 48 may be located, for example, along the hydraulic piping 26 or at the hydraulic motor 24. The hydraulic block 48 is configured to manage the direction of hydraulic fluid flow entering the hydraulic motor 24 such that the rotor of the hydraulic motor 24 always rotates in the same direction, regardless of the direction of rotation of the wheel 14 or the direction of rotation of the hydraulic pump 22. As a result, since the priming pump 46 is driven by the rotation of the hydraulic motor 24, the priming pump 46 will always rotate in the same direction, thus preventing priming pump operational issues.

Structure and function of the hydraulic block 48 will be described further below, with reference to the electrical power generation system 20 hydraulic structure schematic illustration of FIG. 3. As stated above, the hydraulic block 48 is located between the hydraulic pump 22 and the hydraulic motor 24. The hydraulic block includes a plurality of check valves 50 interconnected via hydraulic passages 52, and may further include one or more pressure regulators 54 and/or an electrical on/off valve 80. The hydraulic block 48 is connected to the hydraulic pump 22 via a first pump line 56 and a second pump line 58, and depending on the direction of rotation of the wheel 14, either of the first pump line 56 or the second pump line 58 may function as a pump output line, with the other functioning as a pump input line as the hydraulic fluid circulates through the electrical power generation system 20. The check valves 50, the pressure regulator 54 and the valve 80 are located and oriented such that regardless of the direction of rotation of the wheel 14 and operation of the hydraulic pump 22, the hydraulic fluid exits the hydraulic block 48 along a motor input line 60 to enter the hydraulic motor 24 at a motor inlet 62 and exit the hydraulic motor 24 at a motor outlet 64 and along a motor outlet line 66 prior to returning to the hydraulic pump 22 in this closed hydraulic system. As such, the hydraulic motor 24 always rotates in the same direction, thus urging rotation of the priming pump 46 in the same direction, to provide adequate suction at a suction line 68 of the priming pump 46 to draw adequate hydraulic fluid from a fluid reservoir 70 to maintain the selected hydraulic fluid pressure.

Figure 3:
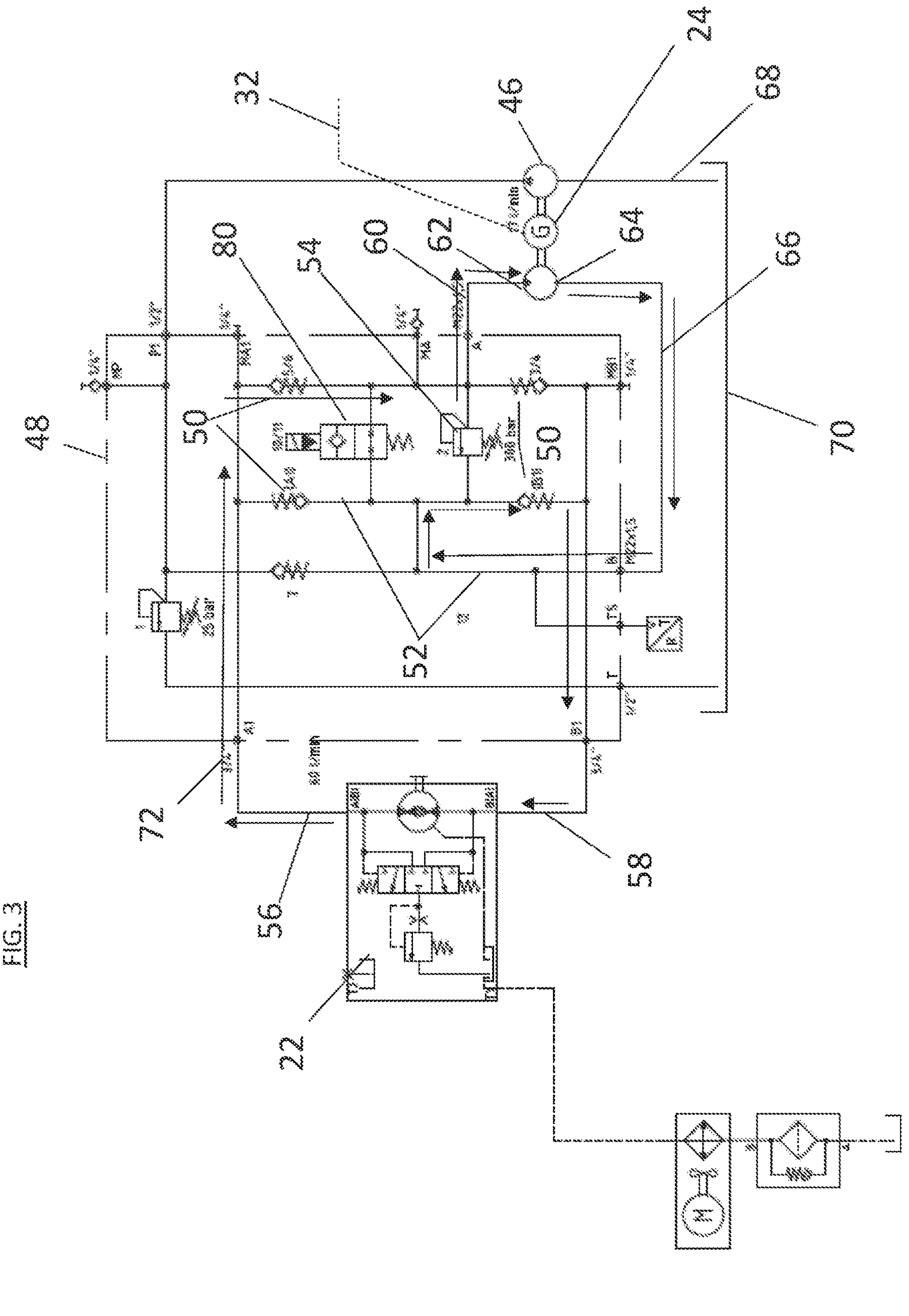
FIG. 3 is a schematic illustration of an embodiment of a hydraulic system for the electrical power generation system.

By way of illustration, in FIG. 3 the wheel 14 may be rotating in a first direction such that hydraulic fluid exits the hydraulic pump 22 via first pump line 56 and into the hydraulic block 48, where the check valves 50 and the pressure regulator 54 direct the hydraulic fluid along a first flow direction as indicated by arrows 72 and into the hydraulic motor 24 via the motor inlet 62. The hydraulic fluid flows out of the hydraulic motor 24 via the motor outlet 64 and along the motor outlet line 66 to the second pump line 58 to re-enter the hydraulic pump 22.

Figure 4:
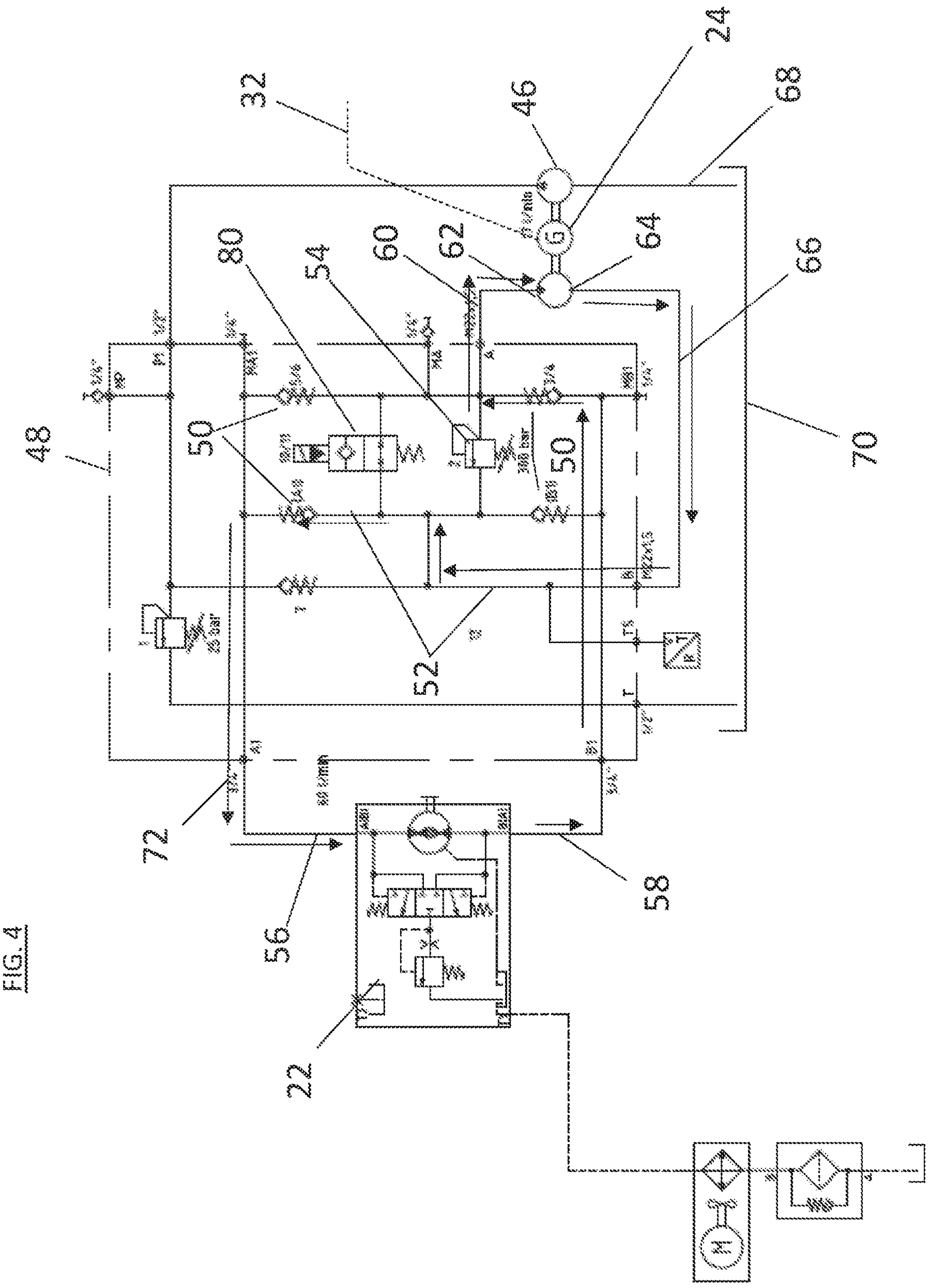
FIG. 4 is another schematic illustration of an embodiment of a hydraulic system for the electrical power generation system.

Further, as shown in FIG. 4, the wheel 14 may be rotating in a second direction opposite the first direction such that hydraulic fluid exits the hydraulic pump 22 via the second pump line 58 and into the hydraulic block 48, where the check valves 50 and the pressure regulator 54 direct the hydraulic fluid along a second flow direction as indicated by arrows 74 and into the hydraulic motor 24 via the motor inlet 62. The hydraulic fluid flows out of the hydraulic motor 24 via the motor outlet 64 and along the motor outlet line 66 to the first pump line 56 to re-enter the hydraulic pump 22.

The systems and components disclosed herein allow the refrigeration units to be powered by rotation of the wheels of the railway car, through a hydraulic-driven electrical power generation system. Further, the connection of the priming pump to the hydraulic motor removes a need for a stand-alone electric motor to drive the priming pump. Also, the hydraulic block including the check valves and pressure regulator directs the hydraulic fluid into a same port of the hydraulic motor regardless of the direction of rotation of the wheel and direction of flow through the hydraulic pump. As a result, the connected priming pump operates in the same direction regardless of the direction of rotation of the wheel and direction of flow through the hydraulic pump to prevent cavitation of priming pump under certain conditions, so the priming pump may be utilized to maintain the selected hydraulic fluid pressure in the system.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical power generation system, comprising:

a hydraulic pump configured to be switchable between operating in a first pump direction and in a second pump direction opposite the first pump direction;

a hydraulic motor operably connected to the hydraulic pump to convert hydraulic flow into electrical power, the hydraulic motor having a motor inlet passage and a motor outlet passage;

a hydraulic block disposed in flow communication with the hydraulic pump and with the hydraulic motor, the hydraulic block configured such that hydraulic fluid flow exiting the hydraulic block toward the hydraulic motor is directed through the motor inlet passage, regardless of whether the hydraulic pump is operating in the first pump or the second pump direction; and a priming pump operably connected to and driven by the hydraulic motor.

2. The electrical power generation system of claim 1, the hydraulic block including a plurality of check valves interconnected with a plurality of hydraulic passages to direct hydraulic fluid flow through the hydraulic block.

3. The electrical power generation system of claim 2, the hydraulic block including a pressure regulator.

4. The electrical power generation system of claim 1, wherein the priming pump is in fluid communication with a hydraulic fluid reservoir to maintain a selected hydraulic fluid pressure in the electrical power generation system.

5. The electrical power generation system of claim 1, wherein the priming pump is driven in only one direction by the hydraulic motor.

6. The electrical power generation system of claim 1, wherein the hydraulic motor is operably connected to one or more batteries to charge the one or more batteries.

7. A transportation refrigeration system, comprising:

a cargo container;

a refrigeration unit operably connected to the cargo container to condition an interior of the cargo container; and an electrical power generation system operably connected to the refrigeration unit to provide electrical power to the refrigeration unit, the electrical power generation system including:

a hydraulic pump configured to be switchable between operating in a first pump direction and in a second pump direction opposite the first pump direction;

a hydraulic motor operably connected to the hydraulic pump to convert hydraulic flow into electrical power, the hydraulic motor having a motor inlet passage and a motor outlet passage;

a hydraulic block disposed in flow communication with the hydraulic pump and with the hydraulic motor, the hydraulic block configured such that hydraulic fluid flow exiting the hydraulic block toward the hydraulic motor is directed through the motor inlet passage, regardless of whether the hydraulic pump is operating in the first pump or the second pump direction; and a priming pump operably connected to and driven by the hydraulic motor.

8. The transportation refrigeration system of claim 7, the hydraulic block including a plurality of check valves interconnected with a plurality of hydraulic passages to direct hydraulic fluid flow through the hydraulic block.

9. The transportation refrigeration system of claim 8, the hydraulic block including a pressure regulator.

10. The transportation refrigeration system of claim 7, wherein the priming pump is in fluid communication with a hydraulic fluid reservoir to maintain a selected hydraulic fluid pressure in the electrical power generation system.

11. The transportation refrigeration system of claim 7, wherein the priming pump is driven in only one direction by the hydraulic motor.

12. The transportation refrigeration system of claim 7, wherein the hydraulic motor is operably connected to one or more batteries to charge the one or more batteries.

13. The transportation refrigeration unit of claim 12, wherein the one or more batteries are operably connected to the refrigeration unit to provide electrical power to the refrigeration unit.

14. The transportation refrigeration system of claim 7, wherein the hydraulic pump is driven by a rotation of a vehicle wheel.

15. The transportation refrigeration system of claim 14, wherein the vehicle wheel is a railway car wheel.

* * * * *